W. V. TURNER.
BRAKE VALVE DEVICE.
APPLICATION FILED NOV. 21, 1917.

1,280,336.

Patented Oct. 1, 1918.

INVENTOR.
Walter V. Turner
by *Wm. N. Cady*
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,280,336.  Specification of Letters Patent.  Patented Oct. 1, 1918.

Original application filed October 21, 1916, Serial No. 126,869. Divided and this application filed November 21, 1917. Serial No. 203,241.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Valve Devices, of which the following is a specification.

This invention relates to locomotive brake equipments, the present application being a division of application Serial No. 126,869, filed October 21, 1916.

More particularly, the invention relates to a brake valve device, the handle of which is adapted to operate a valve in addition to the usual rotary valve, the additional valve being moved in one direction by a spring.

Force is of course required to move the usual rotary valve on its seat and in order to assure the ready and prompt closing of the additional valve by its spring, the principal object of my invention contemplates providing a lost motion between the brake valve handle and the rotary valve, so that the spring acting on the additional valve only has to move the additional valve and the brake valve handle, without moving the rotary valve.

Figure 1:
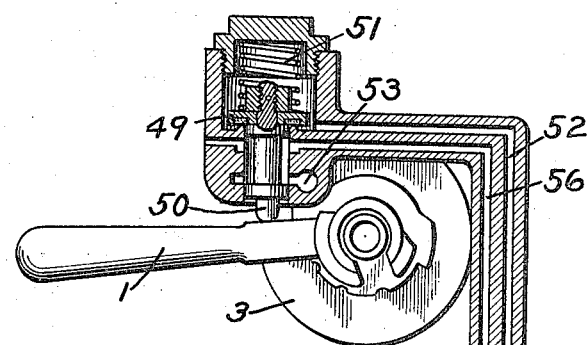
Figure 2:
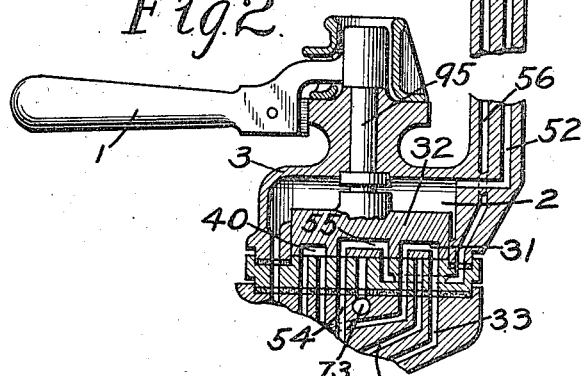
Figure 3:
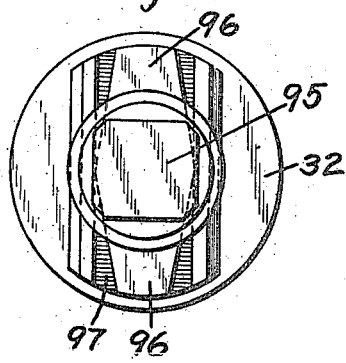

In the accompanying drawing, Figure 1 is a plan view, partly in section, of a brake valve device, embodying my invention; Fig 2 a vertical sectional view thereof, and Fig. 3 a plan view of the brake valve, with the casing removed.

A particular application of my invention is shown in the drawing, in which an independent brake valve device 3 is provided for controlling the locomotive brakes independently of the train brakes.

In order to secure a prompt independent release of the brakes, a pilot valve 49 is provided which is normally adapted to connect a passage 56 with an exhaust port 53, the valve being provided with a stem 50 adapted to be operated by the brake valve handle 1, for connecting a passage 52, leading from the rotary valve chamber 2, to passage 56, and for cutting off the exhaust port 53 from said passage 56.

Passage 56 is connected in the release position of the independent rotary valve 32, through cavity 55 with a passage 54 which leads to a release valve adapted to be operated, when fluid under pressure is supplied to passage 54, for effecting the quick release of the brakes on the locomotive, as described in the hereinbefore mentioned patent application, Serial No. 126,869.

In order to provide lost motion between the rotary valve 32 and the operating stem 95, the inner end of the stem is provided with radially projecting members 96 having tapered sides and adapted to engage within a recess or slot 97 provided in the rotary valve 32, so that the valve stem 95 may be rocked a certain amount, without moving the rotary valve.

In operation, if it is desired to effect the independent release of the locomotive brakes, the brake valve handle 1 is moved from its normal release position so as to engage the stem 50 and thereby lift the valve 49 from its seat. Fluid under pressure is then supplied from rotary valve chamber 2, through passage 52 to passage 56, the exhaust port 53 being cut off by the movement of the valve stem 50. The release of the brakes on the locomotive independently of those on the train is thus effected.

Upon release of the brake valve handle 1, the spring 51 shifts the valve 49 to its closed position, also moving the handle 1 to the position shown in Fig. 1. The lost motion provided between the rotary valve 32 and the stem 95, however, permits the movement of the handle 1 without moving the rotary valve 32, so that a prompt and positive closing of the valve 49 is assured.

Having now described my invention, what I claim as new, and desire to secure by Letters Patent, is:—

1. In a fluid pressure brake, the combination with a brake valve device having a valve provided with ports for controlling the brakes, and a handle for operating said valve having a movement relative thereto, of a spring for moving the handle relatively to the valve.

2. In a brake valve device, the combination with a rotary valve provided with ports for controlling the brakes, of a handle for operating said valve and movable relatively thereto and a spring for opposing movement of the handle to release position and adapted to return the handle to running position without moving the valve.

3. In a brake valve device, the combination with a rotary valve provided with ports for controlling the brakes, of a handle for operating said valve and having a movement relative thereto, a release valve adapted to be operated by movement of said handle to release position, and a spring for opposing said movement and adapted to return the handle to running position without moving the rotary valve.

4. In a brake valve device, the combination with a rotary valve, of a handle for operating said valve provided with a stem adapted to have a movement relative to said valve, a release valve operated by movement of said handle, and a spring acting on said release valve for opposing movement of the handle and adapted to close the release valve and shift the handle without moving the rotary valve.

In testimony whereof I have hereunto set my hand.

WALTER V. TURNER.